(12) United States Patent
Zhou (10) Patent No.: US 9,494,812 B1
(45) Date of Patent: Nov. 15, 2016

(54) MOUNTING STRUCTURE OF LIQUID CRYSTAL DISPLAY DEVICE

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technoloogy Co., Ltd, Shenzhen, Guangdong (CN)

( * ) Notice: Subject to any disclaimer, the term of this patent is extended or adjusted under 35 U.S.C. 154(b) by 402 days.

(21) Appl. No.: 14/368,292

(22) PCT Filed: May 8, 2014

(86) PCT No.: PCT/CN2014/077045
§ 371 (c)(1),
(2) Date: Jun. 23, 2014

(87) PCT Pub. No.: WO2015/161533
PCT Pub. Date: Oct. 29, 2015

(30) Foreign Application Priority Data

Apr. 24, 2014 (CN) .......................... 2014 1 0169764

(51) Int. Cl.
*G02F 1/1333* (2006.01)
*F21V 8/00* (2006.01)

(52) U.S. Cl.
CPC ......... *G02F 1/133308* (2013.01); *G02B 6/009* (2013.01); *G02B 6/0055* (2013.01);
(Continued)

(58) Field of Classification Search
CPC ..................... G02F 1/133308; G02F 2201/46; G02F 2201/465; G02B 6/0055; G02F 1/1613; G02F 1/1601
See application file for complete search history.

(56) References Cited

U.S. PATENT DOCUMENTS

| 6,424,391 B1 * | 7/2002 | Tsukamoto ....... G02F 1/133308 349/58 |
| 7,492,421 B1 * | 2/2009 | Kim .................. G02F 1/133308 349/58 |

(Continued)

FOREIGN PATENT DOCUMENTS

| CN | 101261789 A | 9/2008 |
| CN | 100533214 C | 8/2009 |
| CN | 102798997 A | 11/2012 |

*Primary Examiner* — James Dudek
(74) *Attorney, Agent, or Firm* — Andrew C. Cheng (57) ABSTRACT

The present invention provides a mounting structure of a liquid crystal display device, in which a first side board (213) of a backplane (21) includes an outward-raised first connection section (215) formed thereon so that the first side board (213) forms an insertion space with respect to the first connection section (215). A second side board (83) of the front bezel (8) includes an inward-recessed second connection section (85) formed thereon to correspond to the first connection section (15) so that the second side board (83) forms a channel (87) with respect to the second connection section (85). The second connection section (85) is inserted into the insertion space and is positioned against the first connection section (215). The first connection section (215) is received in the channel (87). The first connection section (215) includes a through hole (216) formed therein. The second connection section (85) includes a threaded hole (851) formed therein to correspond to the through hole (216). A bolt (10) is received through the through hole (216) to be screwed to the threaded hole (851) so as to fix the second side board (83) in such as way as to be mounted on the first side board (213).

15 Claims, 6 Drawing Sheets

(52) U.S. Cl.
 CPC ... *G02B6/0088* (2013.01); *G02F 2001/13332* (2013.01); *G02F 2201/46* (2013.01); *G02F 2202/02* (2013.01)

(56) References Cited

U.S. PATENT DOCUMENTS

| | | | | |
|---|---|---|---|---|
| 2001/0050732 A1* | 12/2001 | Okamoto | ......... | G02F 1/133308 349/58 |
| 2004/0179150 A1* | 9/2004 | Lai | ......... | G02F 1/133308 349/58 |
| 2005/0174506 A1* | 8/2005 | Park | ......... | G02F 1/133308 349/58 |
| 2005/0264714 A1* | 12/2005 | Hwang | ......... | G02F 1/133308 349/58 |
| 2007/0132913 A1* | 6/2007 | Lee | ......... | G02F 1/133308 349/58 |
| 2007/0273808 A1* | 11/2007 | Hsu | ......... | G02F 1/133308 349/58 |
| 2008/0186692 A1 | 8/2008 | Mayumi | | |
| 2012/0002129 A1* | 1/2012 | Azai | ......... | G02F 1/133308 349/58 |
| 2012/0280891 A1* | 11/2012 | Huang | ......... | H05K 5/02 345/1.3 |
| 2013/0010497 A1* | 1/2013 | Lee | ......... | G02B 6/0088 362/611 |
| 2014/0078441 A1* | 3/2014 | Wang | ......... | G02F 1/1336 349/58 |
| 2014/0285746 A1* | 9/2014 | Huang | ......... | G02F 1/133512 349/58 |
| 2015/0177449 A1* | 6/2015 | Uchida | ......... | G02F 1/133308 362/611 |

* cited by examiner

MOUNTING STRUCTURE OF LIQUID CRYSTAL DISPLAY DEVICE

BACKGROUND OF THE INVENTION

1. Field of the Invention

The present invention relates to the field of liquid crystal displaying, and in particular to a mounting structure of a liquid crystal display device.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The backlight modules can be classified in two types, namely a side-edge backlight module and a direct backlight module, according to the site where light gets incident. The side-edge backlight module generally comprises a backplane, a backlight source, a reflector plate, a light guide plate, and an optical film assembly, in which an LED light bar, serving as the backlight source, is arranged at an edge of the backplane to be located rearward of one side of the liquid crystal panel. The LED light bar emits light that enters the light guide plate (LGP) through a light incident face at one side of the light guide plate and is projected out of a light exit face of the light guide plate, after being reflected and diffused, to pass through the optic film assembly so as to form a planar light source for the liquid crystal panel.

Figure 1:
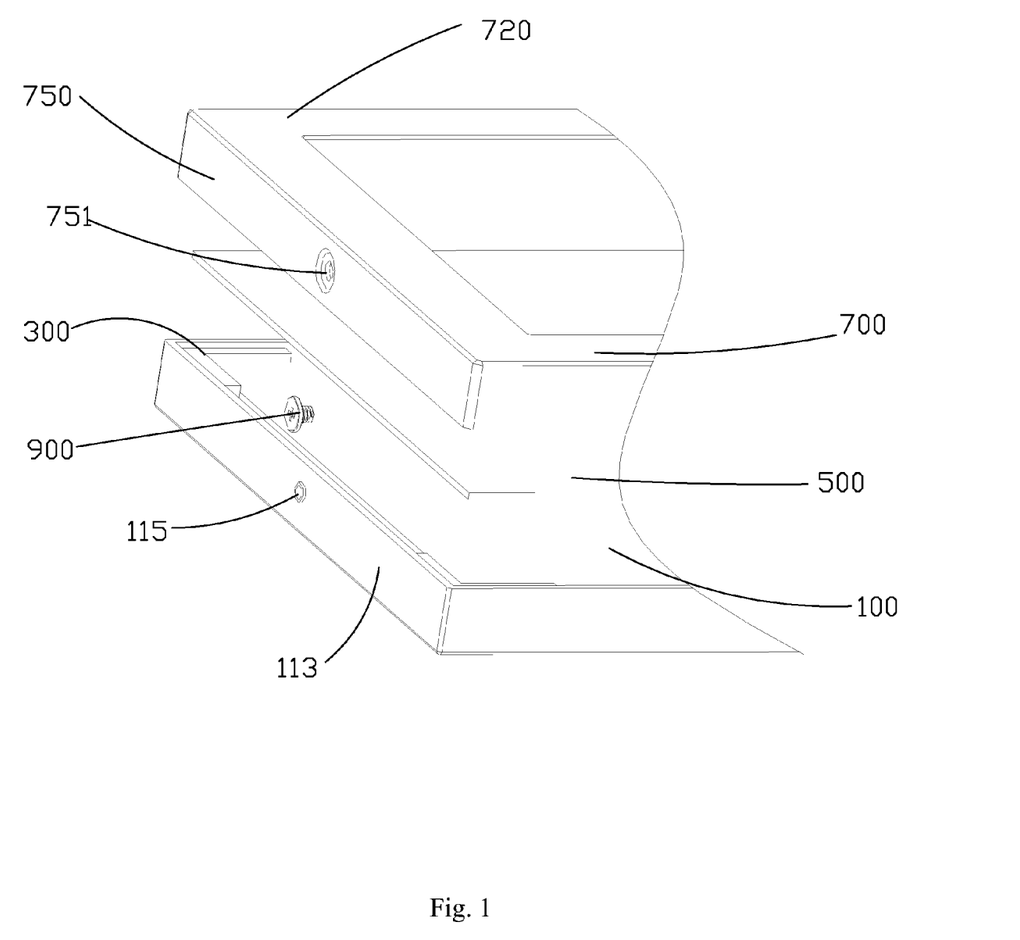
FIG. 1 is an exploded view showing a conventional mounting structure of a liquid crystal display device.
Figure 2:
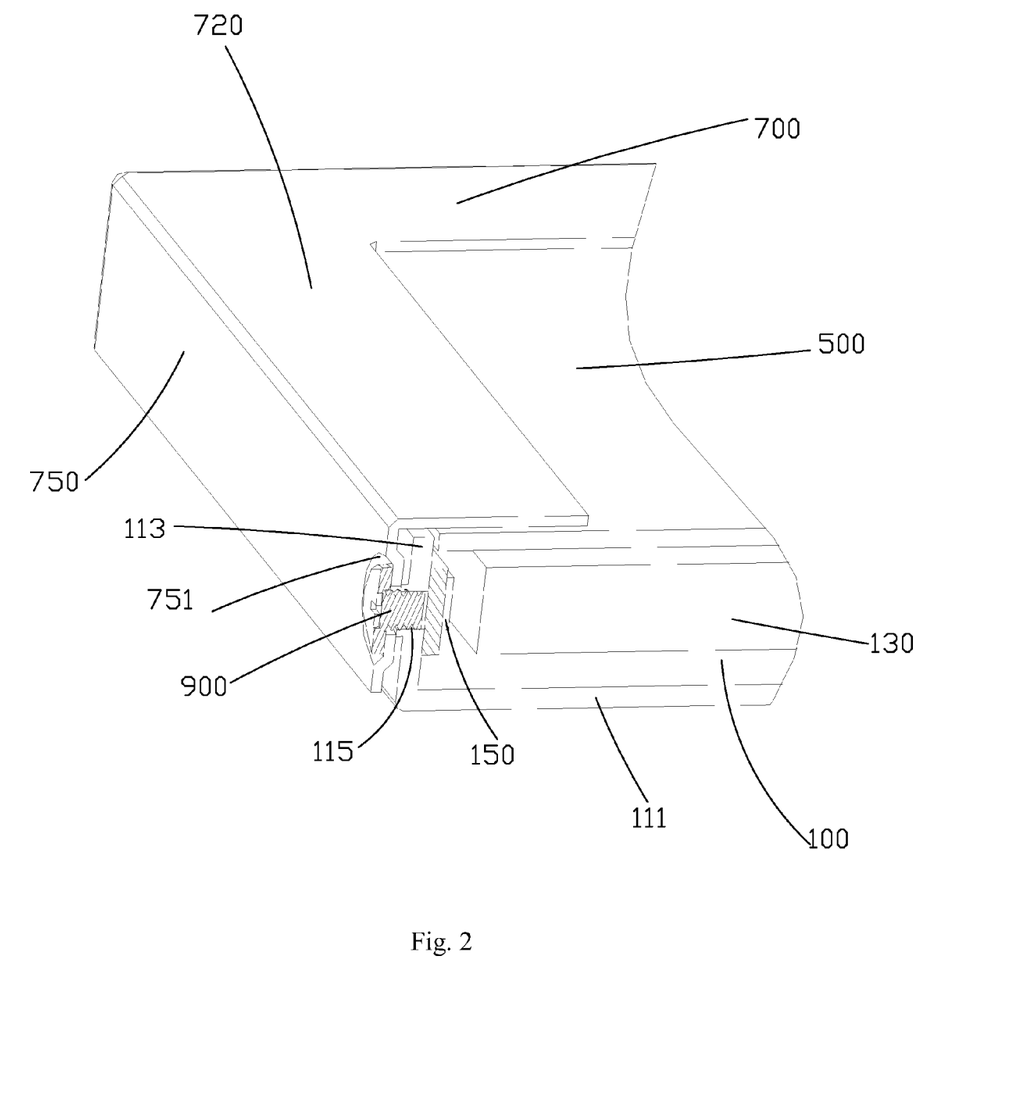
FIG. 2 is a perspective view showing the conventional mounting structure of the liquid crystal in an assembled form.
Figure 3:
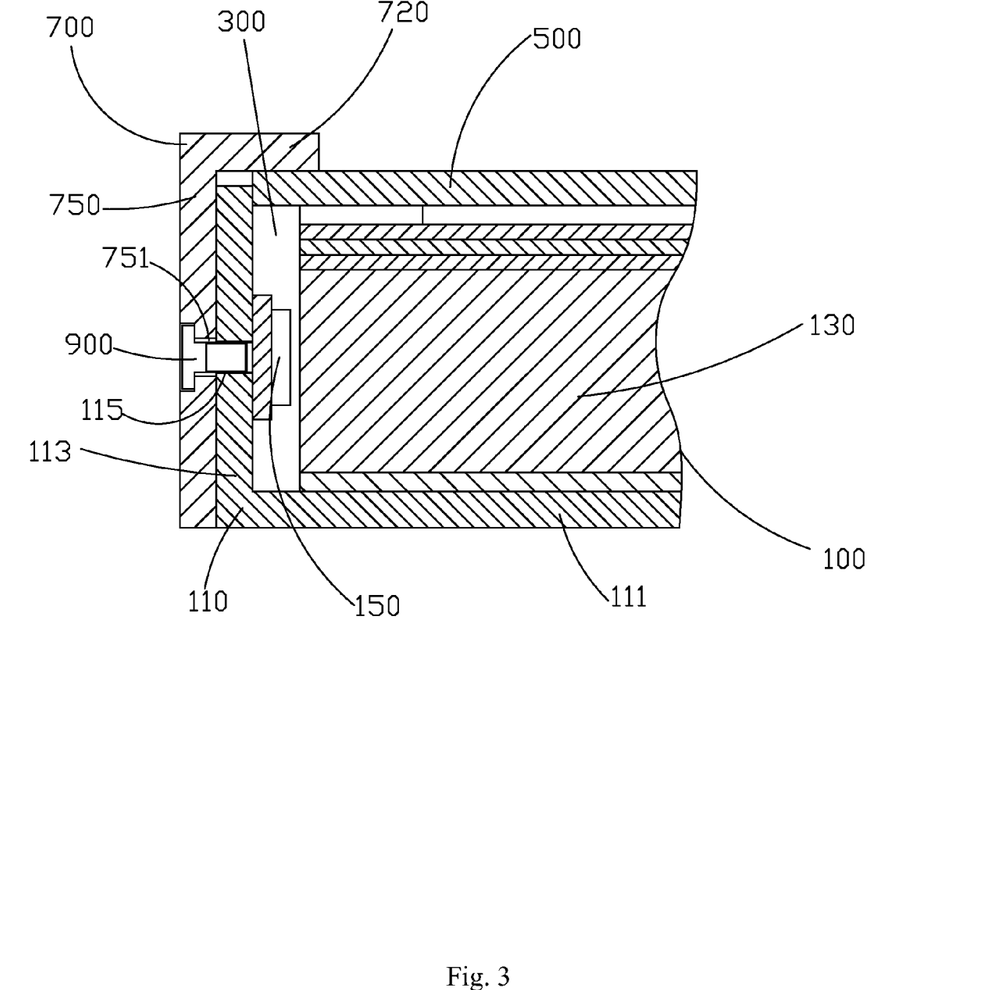
FIG. 3 is a longitudinal cross-sectional view of the conventional mounting structure of the liquid crystal display device.

With the progress of the techniques that are used to manufacture the liquid crystal displays, the development of the liquid crystal displays is in a trend toward bezel slimming. For the known liquid crystal displays that adopt side-edge backlight modules, due to the need for bezel slimming, bolts that are used to mount and fix corresponding components and the lengths of the threads thereof are getting shorter and shorter. Referring to FIGS. 1-3, a conventional mounting structure of a liquid crystal display device is shown, which comprises a backlight module 100, a mold frame 300 mounted in the backlight module 100, a liquid crystal display panel 500 mounted on the mold frame 300, and a front bezel 700 mounted on the liquid crystal display panel 500.

The backlight module 100 comprises: a backplane 110, a light guide plate 130 mounted in the backplane 110, and a backlight source 150 mounted to the backplane 110.

To shorten the distance from the front bezel 700 to the light guide plate 130, the backplane 110 is arranged to provide an additional function to serve as a heat dissipation board and comprises a bottom board 111 and a first side board 113 mounted to one side of the bottom board 111. The backlight source 150 is mounted to an inside surface of the first side board 113. The front bezel 700 comprises a front board 720 and a second side board 750 mounted to one side of the front board 720. The second side board 750 is set on and covers atop the first side board 113.

The second side board 750 of the front bezel 700 comprises a through hole 751 formed therein. The first side board 113 of the backplane 110 comprises a threaded hole 115 formed therein to correspond to the through hole 751. A bolt 900 is received through the through hole 751 to be screwed in the threaded hole 115 for fixing and mounting the front bezel 700 and the backplane 110 together.

Since the backplane 110 is often made of an aluminum material or a copper material that has high thermal conductivity, but low stiffness and is thus a relatively soft material, it is easy that the threaded hole 115 cannot provide a tight engagement with the thread of the bolt 900, leading to insufficient coupling strength, easy occurrence of thread stripping, so s to affect the effect of fixing and mounting between the front bezel 700 and the backplane 110.

SUMMARY OF THE INVENTION

An object of the present invention is to provide a mounting structure of a liquid crystal display device, which makes fixing and mounting between a front bezel and a backplane more secure and reliable so as not to affect bezel slimming of the liquid crystal display device and also to make the structure simple and each to achieve.

To achieve the above object, the present invention provides a mounting structure of a liquid crystal display device, which comprises: a backlight module, a mold frame mounted in the backlight module, a liquid crystal display panel mounted on the mold frame, and a front bezel mounted on the liquid crystal display pane. The backlight module comprises a backplane, a light guide plate mounted in the backplane, and a backlight source mounted in the backplane. The backplane comprises a bottom board and a first side board mounted to one side of the bottom board. The backlight source is mounted to an inside surface of the first side board. The front bezel comprises a front board and a second side board mounted to one side of the front board. The second side board is set on and covers the first side board. The first side board comprises an outward-raised first connection section formed thereon so that first side board forms an insertion space with respect to the first connection section. The second side board comprises an inward-recessed second connection section formed thereon to correspond to the first connection section so that the second side board forms a channel with respect to the second connection section. The second connection section is insertable into the insertion space and positionable against the first connection section. The first connection section is receivable in the channel. The first connection section comprises a through hole formed therein, the second connection section comprising a threaded hole formed therein to correspond to the through hole. A bolt is receivable through the through hole and screwable to the threaded hole so as to fix the second side board in such a way as to be mounted on the first side board.

The through hole of the first connection section is a stepped through hole. The bolt has a head that is receivable in the stepped through hole.

The first connection section has a free end that has a height lower than height of the first side board.

The first connection section has an outside surface that does not project beyond an outside surface of the second side board and the second connection section has an inside surface that does not project beyond an inside surface of the first side board.

The outside surface of the first connection section is substantially flush with the outside surface of the second side board and the inside surface of the second connection section is substantially flush with the inside surface of the first side board.

The bolt comprises a cruciform type cylindrical head bolt, of which the head does not protrude outside the outside surface of the first connection section and a tip thereof being not projecting beyond the inside surface of the second connection section.

The front bezel that is greater than stiffness of the backplane.

The backplane is made of an aluminum sheet and the front bezel is made of an engineering plastic material of acrylonitrile butadiene styrene (ABS).

The mold frame is mounted on the first side board.

The backlight module further comprises a bottom reflector plate that is arranged on one side of the light guide plate that faces the bottom board and an optical film assembly that is arranged on one side of the light guide plate that faces the liquid crystal display panel.

The present invention also provides a mounting structure of a liquid crystal display device, which comprises: a backlight module, a mold frame mounted in the backlight module, a liquid crystal display panel mounted on the mold frame, and a front bezel mounted on the liquid crystal display pane, the backlight module comprising a backplane, a light guide plate mounted in the backplane, and a backlight source mounted in the backplane, the backplane comprising a bottom board and a first side board mounted to one side of the bottom board, the backlight source being mounted to an inside surface of the first side board, the front bezel comprising a front board and a second side board mounted to one side of the front board, the second side board being set on and covering the first side board, the first side board comprising an outward-raised first connection section formed thereon so that first side board forms an insertion space with respect to the first connection section, the second side board comprising an inward-recessed second connection section formed thereon to correspond to the first connection section so that the second side board forms a channel with respect to the second connection section, the second connection section being insertable into the insertion space and positionable against the first connection section, the first connection section being receivable in the channel, the first connection section comprising a through hole formed therein, the second connection section comprising a threaded hole formed therein to correspond to the through hole, a bolt being receivable through the through hole and screwable to the threaded hole so as to fix the second side board in such a way as to be mounted on the first side board;

wherein the through hole of the first connection section is a stepped through hole, the bolt having a head that is receivable in the stepped through hole;

wherein the first connection section has a free end that has a height lower than height of the first side board;

wherein the first connection section has an outside surface that does not project beyond an outside surface of the second side board and the second connection section has an inside surface that does not project beyond an inside surface of the first side board;

wherein the outside surface of the first connection section is substantially flush with the outside surface of the second side board and the inside surface of the second connection section is substantially flush with the inside surface of the first side board; and wherein the bolt comprises a cruciform type cylindrical head bolt, of which the head does not protrude outside the outside surface of the first connection section and a tip thereof being not projecting beyond the inside surface of the second connection section.

The front bezel that is greater than stiffness of the backplane.

The backplane is made of an aluminum sheet and the front bezel is made of an engineering plastic material of acrylonitrile butadiene styrene (ABS).

The mold frame is mounted on the first side board.

The backlight module further comprises a bottom reflector plate that is arranged on one side of the light guide plate that faces the bottom board and an optical film assembly that is arranged on one side of the light guide plate that faces the liquid crystal display panel.

The efficacy of the present invention is that the present invention provides a liquid crystal display device, in which the first side board of the backplane is provided with an outward-raised first connection section and the second side board of the front bezel is provided with an inward-recessed second connection section corresponding to the first connection section, whereby the first connection section is receivable in the second connection section and a bolt is used to join the first connection section and the second connection section so as to fix and mount the front bezel and the backplane together. Thus, on the one hand, no additional connection component is added so as not to affect bezel slimming of the liquid crystal display device, and on the other hand, the front bezel is made of a material that is apparently stiffer than that of the backplane so that the mounting between the front bezel and the backplane is secure and reliable and the structure is easy and can be achieved readily.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 4:
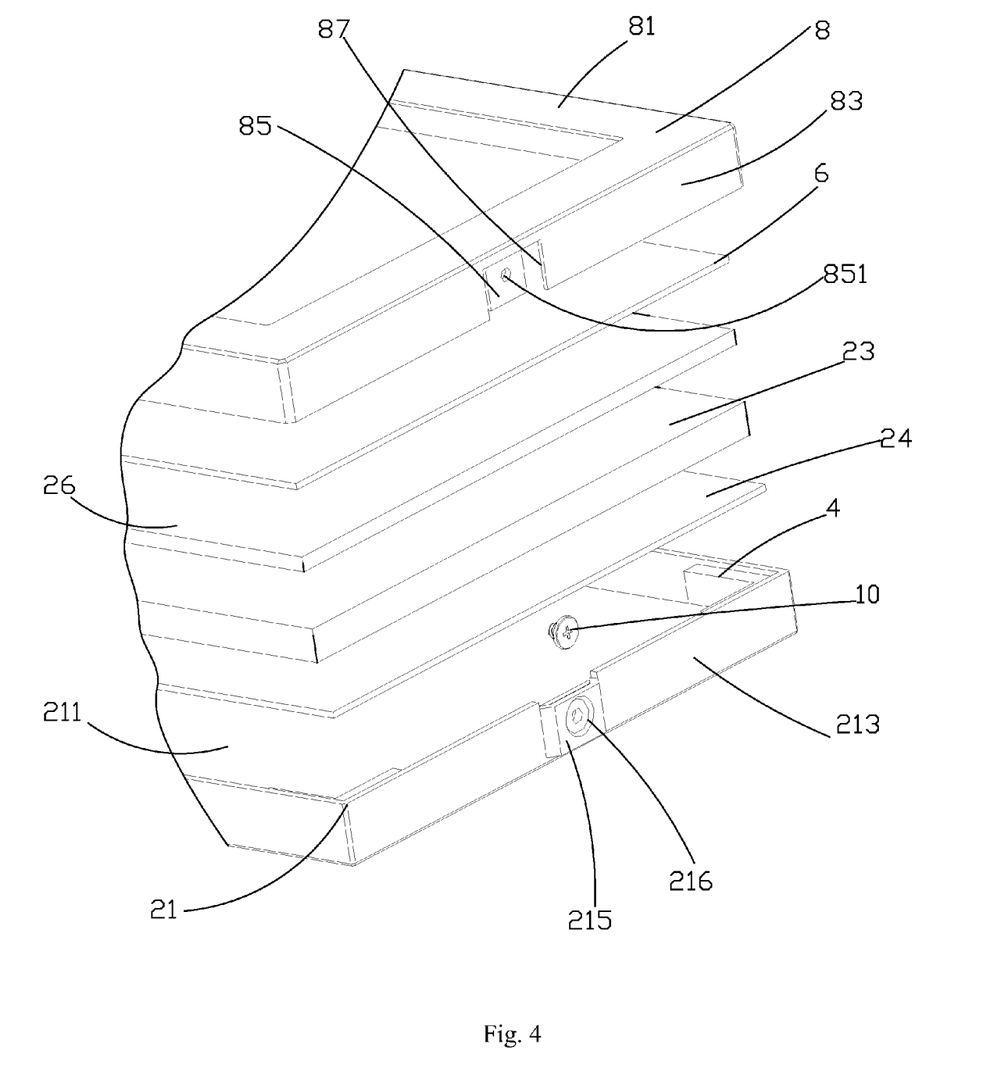
FIG. 4 is an exploded view showing a mounting structure of a liquid crystal display device according to the present invention.
Figure 5:
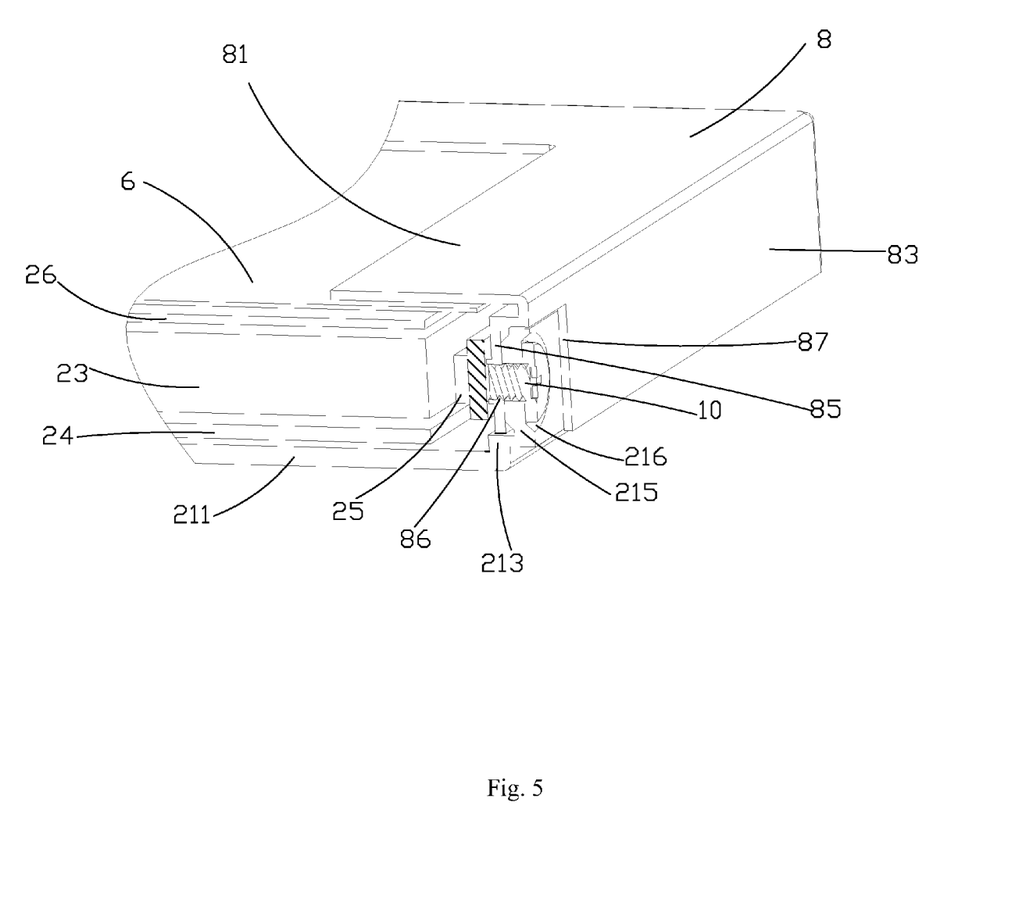
FIG. 5 is a perspective view showing the mounting structure of the liquid crystal according to the present invention in an assembled form.
Figure 6:
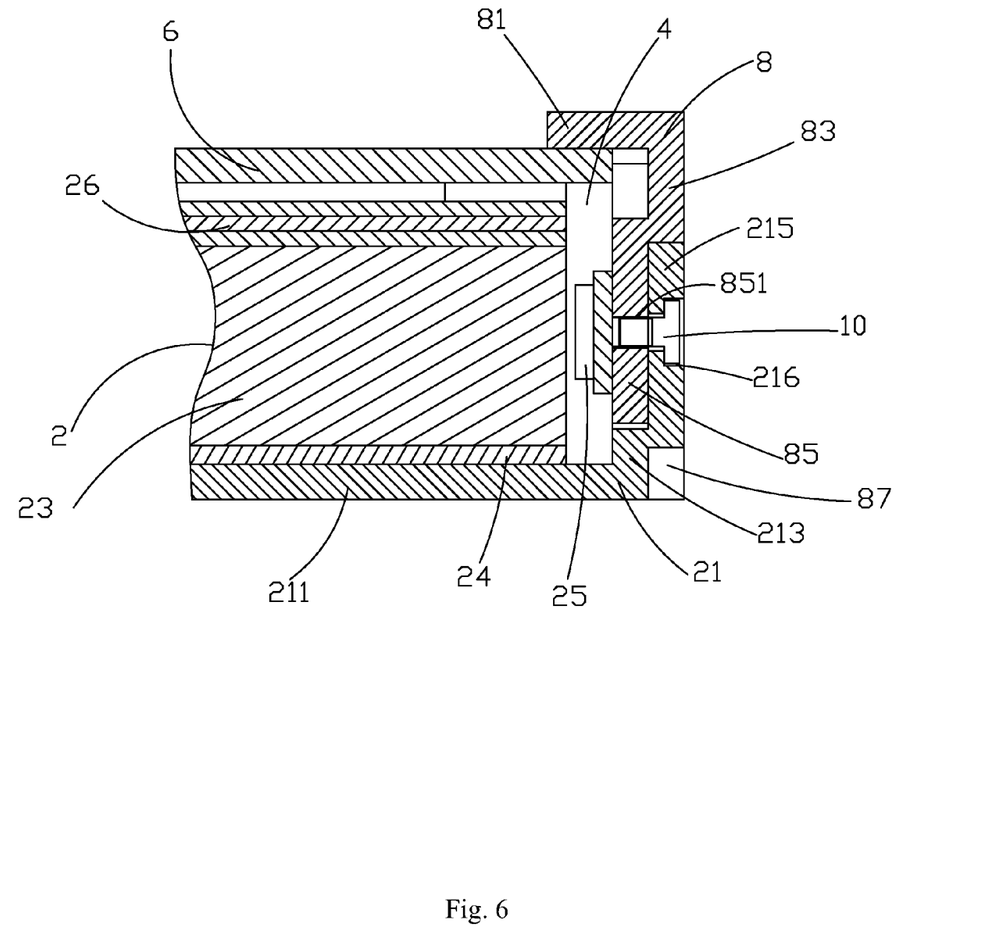
FIG. 6 is a longitudinal cross-sectional view of the mounting structure of the liquid crystal display device according to the present invention.

Referring to FIGS. 4-6, the present invention provides a mounting structure of a liquid crystal display device, which comprises: a backlight module 2, a mold frame 4 mounted in the backlight module 2, a liquid crystal display panel 6 mounted on the mold frame 4, and a front bezel 8 mounted on the liquid crystal display panel 6. The backlight module 2 comprises a backplane 21, a light guide plate 23 mounted in the backplane 21, and a backlight source 25 mounted in the backplane 21.

To shorten the distance from the front bezel 8 to a light incident side of the light guide plate 23, the backplane 21 is arranged to additional provide a function of serving as a heat dissipation plate and comprises: a bottom board 211 and a first side board 213 mounted to one side of the bottom board 211. The backlight source 25 is mounted to an inside surface of the first side board 213. The first side board 213 comprises an outward-raised first connection section 215 formed thereon so that first side board 213 forms an insertion space with respect to the first connection section 215. The first connection section 215 has a free end that has a height lower than the height of the first side board 213. The first connection section 215 comprises a through hole 216 formed therein and preferably, the through hole 216 is a stepped through hole.

The backplane 21 is made of a material that has high thermal conductivity and low stiffness and is relatively soft. In the instant embodiment, the backplane 21 is made of an aluminum sheet.

The front bezel 8 comprises a front board 81 and a second side board 83 mounted to one side of the front board 801. The second side board 83 is set on and covers atop the first side board 213. The second side board 83 comprises an inward-recessed second connection section 85 formed thereon to correspond to the first connection section 215 so that the second side board 83 forms a channel 87 with respect to the second connection section 85. The channel 87 has a width that is greater than width of the second connection section 85 and the channel 87 has a height greater than the second connection section 85. The second connection section 85 comprises a threaded hole 851 formed therein to correspond to the through hole 216.

The front bezel 8 has a stiffness that is greater than the stiffness of the backplane 21. In the instant embodiment, the front bezel 8 is made of an engineering plastic material of ABS (Acrylonitrile Butadiene Styrene), which has stiffness greater than that of the aluminum sheet.

To mount the liquid crystal display device, the second connection section 85 is inserted into the insertion space and is positioned against the first connection section 215. The first connection section 215 is received in the channel 87. A bolt 10 is received through the through hole 216 to be screwed in the threaded hole 851 so as to fix the second side board 83 of the front bezel 8 in such a way as to be mounted on the first side board 213 of the backplane 21.

Since the threaded hole 851 is formed in the front bezel 8 that is made of an engineering plastic material of ABS and the through hole 216 is formed in the backplane 21 that is made of an aluminum sheet, the material of the front bezel 8 is apparently stiffer than that of the backplane 21, so that the bolt 10 that extends through the through hole 216 to get screwed in the threaded hole 851 would allow the threaded hole 851 to tightly engage the thread of the bolt 10, helping improve coupling strength between the two, preventing thread stripping, enhancing the fixing and mounting effect between the front bezel 8 and the backplane 21.

Further, the first connection section 215 has an outside surface that does not project beyond an outside surface of the second side board 83 so as to ensure outside appearance aesthetics of the liquid crystal display device. The second connection section 85 has an inside surface that does not project beyond an inside surface of the first side board 213 in order to facilitate mounting off the backlight source 25. Preferably, the outside surface of the first connection section 215 is substantially flush with the outside surface of the second side board 83 and the inside surface of the second connection section 85 is substantially flush with the inside surface of the first side board 213.

The bolt 10 can be a cruciform type cylindrical head bolt, of which the head can be received in the stepped through hole without protruding outside the outside surface of the first connection section 215 so as to ensure the outside appearance aesthetics of the liquid crystal display device and a tip thereof is not projecting beyond the inside surface of the second connection section 85 to facilitate mounting of the backlight source 25.

The mold frame 4 is mounted on the first side board 213.

The backlight module 2 may further comprises a bottom reflector plate 24 that is arranged on the side of the light guide plate 23 that faces the bottom board 211 and an optical film assembly 26 that is arranged on the side of the light guide plate 23 that faces the liquid crystal display panel 6.

In summary, the present invention provides a liquid crystal display device, in which the first side board of the backplane is provided with an outward-raised first connection section and the second side board of the front bezel is provided with an inward-recessed second connection section corresponding to the first connection section, whereby the first connection section is receivable in the second connection section and a bolt is used to join the first connection section and the second connection section so as to fix and mount the front bezel and the backplane together. Thus, on the one hand, no additional connection component is added so as not to affect bezel slimming of the liquid crystal display device, and on the other hand, the front bezel is made of a material that is apparently stiffer than that of the backplane so that the mounting between the front bezel and the backplane is secure and reliable and the structure is easy and can be achieved readily.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A mounting structure of a liquid crystal display device, comprising: a backlight module, a mold frame mounted in the backlight module, a liquid crystal display panel mounted on the mold frame, and a front bezel mounted on the liquid crystal display pane, the backlight module comprising a backplane, a light guide plate mounted in the backplane, and a backlight source mounted in the backplane, the backplane comprising a bottom board and a first side board mounted to one side of the bottom board, the backlight source being mounted to an inside surface of the first side board, the front bezel comprising a front board and a second side board mounted to one side of the front board, the second side board being set on and covering the first side board, the first side board comprising an outward-raised first connection section formed thereon so that first side board forms an insertion space with respect to the first connection section, the second side board comprising an inward-recessed second connection section formed thereon to correspond to the first connection section so that the second side board forms a channel with respect to the second connection section, the second connection section being insertable into the insertion space and positionable against the first connection section, the first connection section being receivable in the channel, the first connection section comprising a through hole formed therein, the second connection section comprising a threaded hole formed therein to correspond to the through hole, a bolt being receivable through the through hole and screwable to the threaded hole so as to fix the second side board in such a way as to be mounted on the first side board.

2. The mounting structure of the liquid crystal display device as claimed in claim 1, wherein the through hole of the first connection section is a stepped through hole, the bolt having a head that is receivable in the stepped through hole.

3. The mounting structure of the liquid crystal display device as claimed in claim 2, wherein the first connection section has a free end that has a height lower than height of the first side board.

4. The mounting structure of the liquid crystal display device as claimed in claim 1, wherein the first connection section has an outside surface that does not project beyond an outside surface of the second side board and the second connection section has an inside surface that does not project beyond an inside surface of the first side board.

5. The mounting structure of the liquid crystal display device as claimed in claim 4, wherein the outside surface of the first connection section is substantially flush with the outside surface of the second side board and the inside surface of the second connection section is substantially flush with the inside surface of the first side board.

6. The mounting structure of the liquid crystal display device as claimed in claim 2, wherein the bolt comprises a cruciform type cylindrical head bolt, of which the head does not protrude outside the outside surface of the first connection section and a tip thereof being not projecting beyond the inside surface of the second connection section.

7. The mounting structure of the liquid crystal display device as claimed in claim 1, wherein the front bezel that is greater than stiffness of the backplane.

8. The mounting structure of the liquid crystal display device as claimed in claim 7, wherein the backplane is made of an aluminum sheet and the front bezel is made of an engineering plastic material of acrylonitrile butadiene styrene (ABS).

9. The mounting structure of the liquid crystal display device as claimed in claim 1, wherein the mold frame is mounted on the first side board.

10. The mounting structure of the liquid crystal display device as claimed in claim 1, wherein the backlight module further comprises a bottom reflector plate that is arranged on one side of the light guide plate that faces the bottom board and an optical film assembly that is arranged on one side of the light guide plate that faces the liquid crystal display panel.

11. A mounting structure of a liquid crystal display device, comprising: a backlight module, a mold frame mounted in the backlight module, a liquid crystal display panel mounted on the mold frame, and a front bezel mounted on the liquid crystal display pane, the backlight module comprising a backplane, a light guide plate mounted in the backplane, and a backlight source mounted in the backplane, the backplane comprising a bottom board and a first side board mounted to one side of the bottom board, the backlight source being mounted to an inside surface of the first side board, the front bezel comprising a front board and a second side board mounted to one side of the front board, the second side board being set on and covering the first side board, the first side board comprising an outward-raised first connection section formed thereon so that first side board forms an insertion space with respect to the first connection section, the second side board comprising an inward-recessed second connection section formed thereon to correspond to the first connection section so that the second side board forms a channel with respect to the second connection section, the second connection section being insertable into the insertion space and positionable against the first connection section, the first connection section being receivable in the channel, the first connection section comprising a through hole formed therein, the second connection section comprising a threaded hole formed therein to correspond to the through hole, a bolt being receiveable through the through hole and screwable to the threaded hole so as to fix the second side board in such a way as to be mounted on the first side board;

wherein the through hole of the first connection section is a stepped through hole, the bolt having a head that is receivable in the stepped through hole;

wherein the first connection section has a free end that has a height lower than height of the first side board;

wherein the first connection section has an outside surface that does not project beyond an outside surface of the second side board and the second connection section has an inside surface that does not project beyond an inside surface of the first side board;

wherein the outside surface of the first connection section is substantially flush with the outside surface of the second side board and the inside surface of the second connection section is substantially flush with the inside surface of the first side board; and wherein the bolt comprises a cruciform type cylindrical head bolt, of which the head does not protrude outside the outside surface of the first connection section and a tip thereof being not projecting beyond the inside surface of the second connection section.

12. The mounting structure of the liquid crystal display device as claimed in claim 11, wherein the front bezel that is greater than stiffness of the backplane.

13. The mounting structure of the liquid crystal display device as claimed in claim 12, wherein the backplane is made of an aluminum sheet and the front bezel is made of an engineering plastic material of acrylonitrile butadiene styrene (ABS).

14. The mounting structure of the liquid crystal display device as claimed in claim 11, wherein the mold frame is mounted on the first side board.

15. The mounting structure of the liquid crystal display device as claimed in claim 11, wherein the backlight module further comprises a bottom reflector plate that is arranged on one side of the light guide plate that faces the bottom board and an optical film assembly that is arranged on one side of the light guide plate that faces the liquid crystal display panel.

* * * * *